March 21, 1967 D. M. MacMILLAN 3,309,737
TIRE MOLD ALIGNING APPARATUS
Original Filed March 29, 1960 2 Sheets-Sheet 1
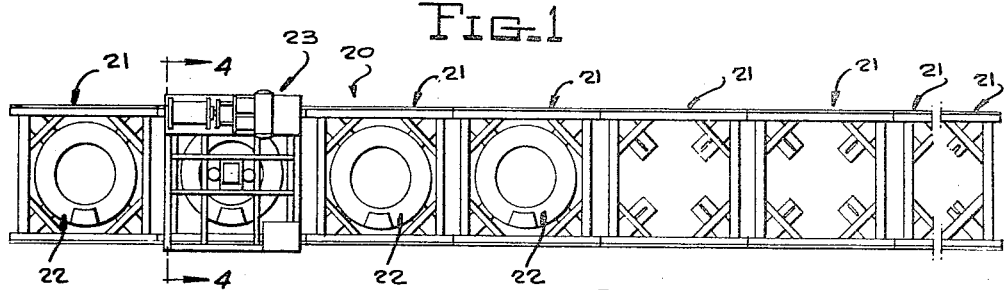
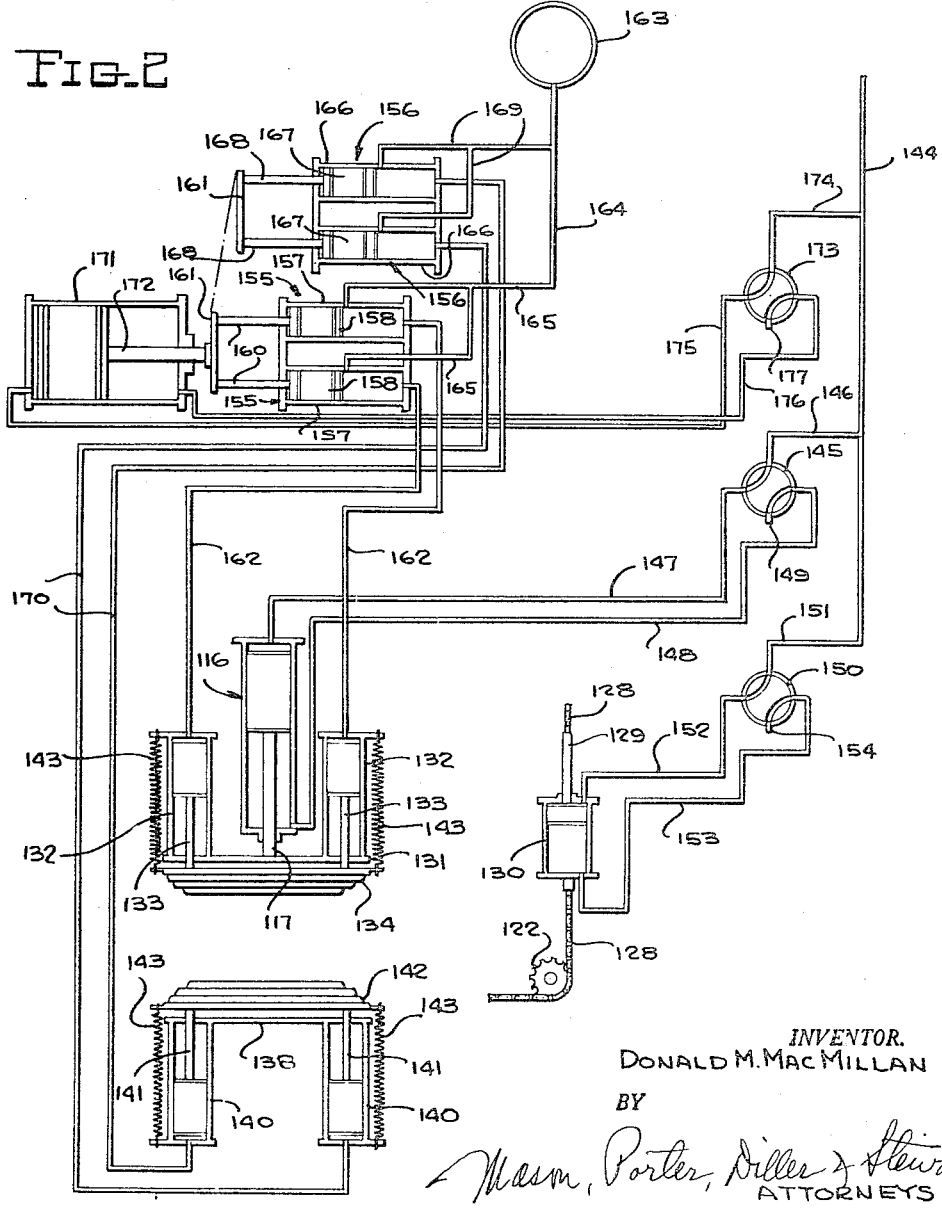
INVENTOR.
DONALD M. MacMILLAN
BY
Mason, Porter, Diller & Stewart
ATTORNEYS

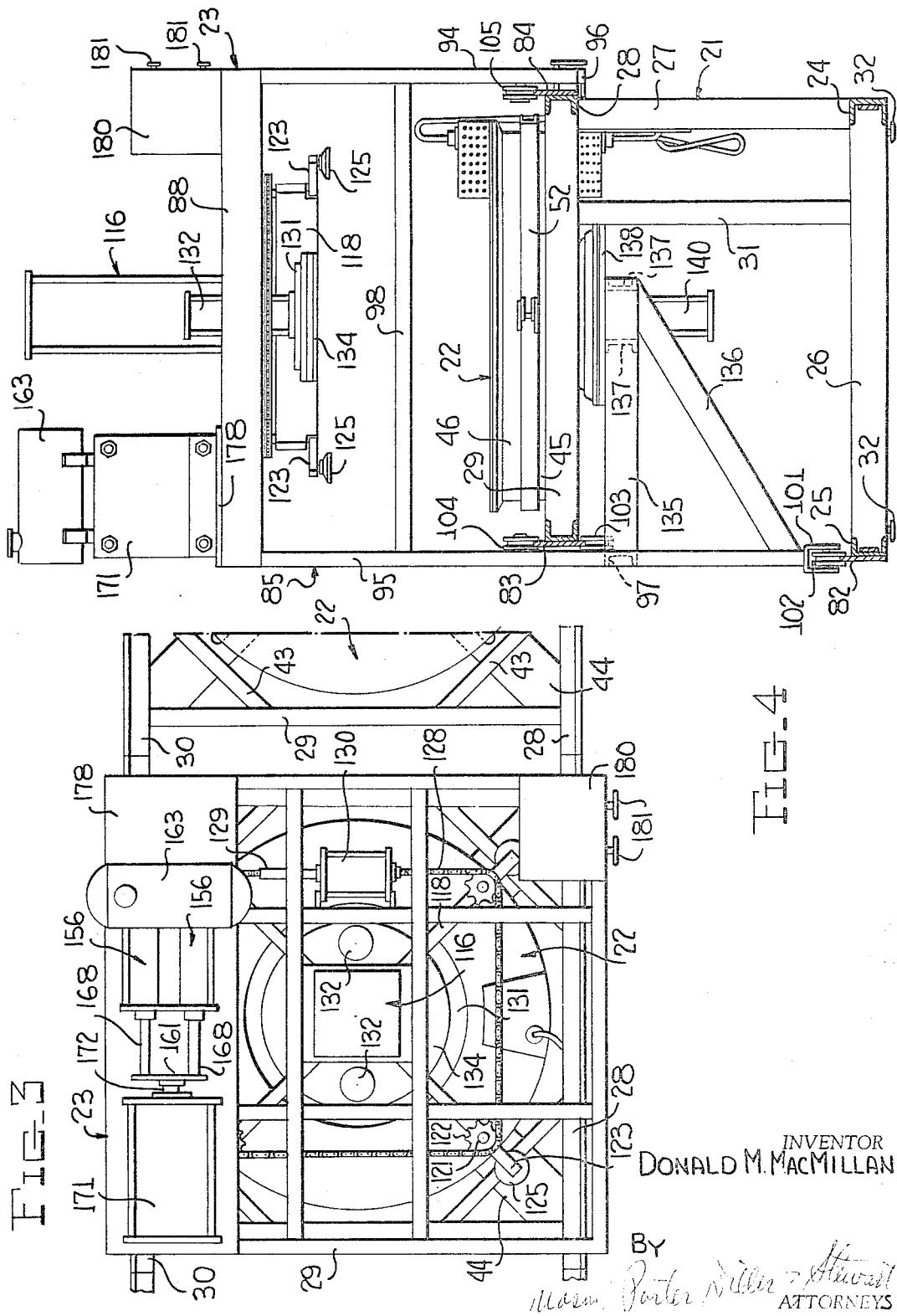

United States Patent Office 3,309,737
Patented Mar. 21, 1967

3,309,737
TIRE MOLD BEAD ALIGNING APPARATUS
Donald M. MacMillan, P.O. Box 557, Macon, Ga. 31202; Kenneth T. MacMillan, executor of said Donald M. MacMillan, deceased
Original application Mar. 29, 1960, Ser. No. 18,399, now Patent No. 3,137,032, dated June 16, 1964. Divided and this application Apr. 2, 1964, Ser. No. 356,816
5 Claims. (Cl. 18—18)

This is a division of my copending application Serial No. 18,399, filed Mar. 29, 1960 and now U.S. Patent No. 3,137,032 issued June 16, 1964. This invention relates in general to new and useful improvements in tire treading apparatus and more particularly to a novel apparatus for aligning the beads of a tire during the curing of the tread thereof.

In the molding of a tread on a tire, the tire is placed within a matrix and is inflated by means of a curing tube placed therein. During the curing of the tread of the tire, it is essential that the beads of the tire be properly centered. In order to accomplish this, tire treading mechanisms are conventionally provided with bead aligners. These beads aligners are disposed in opposed relation and are normally carried by fluid cylinders which are simultaneously actuated from a common pressurized fluid source. However, not all tires have the beads thereof of equal resistance to movement with the result that the weakest bead of a tire is moved farther than the stronger bead. Also, it has been noted that there is a differential in position between the upper bead and a lower bead of a tire due to the fact that the lower bead aligner must lift the lower bead while the upper bead aligner is aided by gravity as opposed to being opposed thereto.

In view of the foregoing, it is the primary object of this invention to provide a novel bead aligner arrangement which although it is fluid actuated will provide for equal movement of bead aligners irrespective of the resistance of associated beads to movement thereby.

Another object of this invention is to provide in a tire curing apparatus a bead aligner system which includes a pair of opposed bead aligners which are fluid actuated by means of separate fluid cylinders and wherein the amount of fluid directed to the cylinders of the two bead aligners is accurately controlled so as to accurately control the amount of movement of the bead aligners.

Yet another object of the invention is to provide a novel bead aligner for use in conjunction with a matrix to properly align the beads of a tire which is to be provided with a tread, the bead aligner including two opposed aligning rings which are engageable with the beads of a tire, and means for moving the aligning rings towards and away from each other, the means including a fluid system which is of a nature which permits the aligning rings to be moved at equal rates towards and away from each other so that the aligning rings remain equi-distant from a fixed center therebetween irrespective of the pressures applied to the individual aligning rings.

With the above and other objects in view that will hereinafter appear, the nature of the invention will be more clearly understood by reference to the following detailed description, the appended claims and the several views illustrated in the accompanying drawings:

In the drawings:

FIGURE 1 is a plan view of a tire retreading apparatus in accordance with this invention, and shows a plurality of matrices supported in alignment and a matrix loader being associated with one of the matrices.

FIGURE 2 is a diagrammatic view showing the fluid system for operating the tire treading apparatus.

FIGURE 3 is an enlarged fragmentary plan view of an intermediate portion of the liner matrices, and shows the relationship of the matrix loader with respect to one of the matrices.

FIGURE 4 is an enlarged transverse sectional view taken along the line 4—4 of FIGURE 1, and shows further the details of the matrix loader and the relationship thereof with respect to one matrix and the support therefor.

In the drawings, the over-all assembly of the tire treading apparatus is best illustrated in FIGURE 1, and the treading apparatus is generally referred to by the numeral 20. The tire treading apparatus 20 including a plurality of matrix supports, which are referred to by the numeral 21, disposed in a single file alignment. Each of the matrix supports 21 supports a matrix, generally referred to by the numeral 22, the matrices of several of the matrix supports being omitted for purposes of clarity. The matrices 22 are disposed uppermost and rest on the top portions of the matrix supports 21. The tire treading apparatus 20 also includes a press or matrix loader, generally referred to by the numeral 23. The matrix loader 23 is suitably mounted on the matrix supports 21 for movement therealong and is selectively positioned in overlying relation to individual ones of the matrices 22 for use in cooperation with the matrices 22.

Each of the matrix supports 21 is generally C shaped in transverse elevation, as is best shown in FIGURE 4. Each matrix support includes a base portion formed by a pair of longitudinally extending channel-shaped frame members 24, 25, the frame member 24 being disposed forwardmost and the frame member 25 being disposed rearwardmost. The longitudinal frame members 24 and 25 are joined together adjacent their ends by transverse frame members 26, the frame members 24, 25 and 26 being disposed co-planar.

A pair of uprights 27 extend upward from the frame member 24 at the intersections thereof with the transverse frame members 26. An upper longitudinal frame member 28 extends between and secures together upper ends of the uprights 27. A pair of transverse frame members 29 are secured to the frame member 28 and extend rearwardly therefrom in spaced parallel relation, the frame members 29 overlying the frame members 26. The rear ends of the frame members 29 are connected together by a rear longitudinal frame member 30. Although the frame members 29 are generally cantilevered, they are additionally supported by uprights 31 which extend upwardly from the transverse frame members 26 adjacent the longitudinal frame members 24.

The individual matrix support 21 is level and is supported by means of a plurality of feet 32. After the matrix supports have been leveled, they are secured together in any desired manner by securing together the frame members 24, 25, 28 and 30 of adjacent matrix supports 21.

Referring now to FIGURE 3 in particular, it will be seen that the frame members 28, 29 and 30 are braced by means of diagonal braces 43. Additionally, horizontal supports 44 project inwardly from each of the corners defined by the frame members 28, 29 and 30 and underlie the braces 43, the supports 44 being secured to the frame members and the braces. The matrices 22 rest upon the supports 44 and are secured thereto by adjustable securing means (not shown).

Referring now to FIGURE 4 once again, it will be seen that each matrix 22 includes a lower matrix half 45 and an upper matrix half 46. The matrices 22 in themselves do not form a part of this invention and it is sufficient to note that the matrix halves 45, 46 are releasably locked together by means of a locking band 52. Each of the matrices 22 is adapted to receive a tire to be cured with the tire having the usual beads. Also, in the curing of a tire, a conventional curing tube (not shown) is disposed within the tire and is held in place by means of a conventional curing rim (not shown).

It is to be understood that each matrix 22 is complete in itself to accomplish the desired function of curing a tire tread. However, it is necessary that means be provided for opening and closing the matrices 22 and for accurately positioning the beads of tires disposed therein.

During a matrix loading and unloading operation, it is necessary that the matrix half 46 be elevated with respect to the matrix half 45. It is also necessary that the matrix 22 be fixed relative to its associated matrix support 21 in a centered position with the lower matrix half 45 fixed against vertical movement. In order to accomplish this, the lower matrix half 45 is suitably secured to the supports 44 in a readily releasable manner. The matrix loader 23 travels along the line of matrix supports 21 and is selectively positioned in overlying relation to one of the matrix supports for the purpose of opening and closing the individual matrix with which it is aligned. To this end, the matrix supports 21 are provided with a plurality of rails. These rails include a bottom rear rail 82 which is secured to the longitudinal frame member 25 and projects upwardly thereabove. A second rear rail is secured to the rear surface of the longitudinal frame member 30 and projects both above and below this frame member. A forward rail 84 is secured to the forward face of the longitudinal frame member 28 and projects upwardly therefrom. The positions of the rails 82, 83 and 84 are best illustrated in FIGURE 4.

The matrix loader 23 includes a frame which is generally referred to by the numeral 85. The frame 85 includes a generally rectangular top frame structure which is referred to by the numeral 88. A pair of forward standards 94 depend from the front corners of the top frame structure 88. A pair of rear standards 95 depend from the rear corners of the top frame structure 88. As is best illustrated in FIGURE 4, the standards 95 are much longer than the standards 94. The lower ends of the standards 94 are connected together by a longitudinal frame member 96. Lower portions of the standards 95 are connected together by a longitudinal frame member 97, the frame member 97 being disposed slightly below the upper surface of the matrix supports 21. Adjacent ones of the standards 94 and 95 are connected together by transverse frame members 98.

The lower ends of the standards 95 are provided with yokes 101 which carry wheels 102, and the wheels 102 are grooved and engage the upper surface of the rail 82. Other grooved rear wheels 103 engage the undersurface of the rail 83, the wheels 103 being carried by the standards 95. The standards 95 also support grooved wheels 104 which engage the upper surface of the rail 83. The lower portions of the standards 94 carry grooved wheels 105 which ride on the upper surface of the rail 84. It will be readily apparent that the wheels 102, 104 and 105 support the matrix loader 23 for rolling movement along the line of matrix supports 21, and the wheels 103 prevent the upward movement of the matrix loader 23 with respect to the matrix supports 21.

Referring now to FIGURE 4 in particular, it will be seen that a vertically disposed double acting hydraulic cylinder is mounted on the upper frame structure 88 of the matrix loader frame in a centrally located position, the hydraulic cylinder being generally referred to by the numeral 116. The hydraulic cylinder 116 supports an X-frame 118 for vertical movement, the X-frame 118 being horizontally disposed.

Referring now to FIGURE 3 in particular, it will be seen that the outer end of each arm of the X-frame 118 has a shaft 121 journaled therein. A sprocket 122 is secured to the upper end of each shaft 121 and an arm 123 is secured to the lower end of each shaft 121. The opposite end of the arm 123 carries a horizontally disposed upper matrix half engaging support 125 which is generally of a wheel shape and is contoured to interlock with the upper matrix half 46.

An elongated chain 128 is engaged over the several sprockets 122. The chain 128 has one end thereof connected to a piston rod 129 of a horizontally disposed hydraulic cylinder 130, and the other end thereof connected to the opposite end of the piston rod 129. The hydraulic cylinder 130 is of the double acting type and is suitably mounted on the upper frame structure 88. It will be seen that when the hydraulic cylinder 130 is actuated to move the chain 128, the arms 123 will be swung to move the supports 125 inwardly or outwardly, as desired.

In FIGURE 4, the X-frame 118 is illustrated as having the central portion thereof recessed. Seated in the upper part of the recess and rigidly secured to the X-frame is a circular mounting plate 131. A pair of transversely spaced, vertically disposed, single acting hydraulic cylinders 132 are secured to the upper portion of the plate 131. Each hydraulic cylinder 132 has a piston rod 133 (FIGURE 2) which extends through the plate 131 and which is secured to a bead aligner 134. The bead aligner 134 is of a stepped type to be used with a plurality of different diameter beads.

Referring once again to FIGURE 4 in particular, it will be seen that each of the standards 95 has extending forwardly therefrom a frame member 135 which lies generally in the same plane as the frame member 97. Each of the frame members 135 is braced by an upwardly and forwardly sloping diagonal brace 136 which is secured to the lower portion of its respective standard 95. A pair of frame members 137 extend between the frame members 135, the frame members 137 being centered on the center of the hydraulic cylinder 116. A circular plate 138 overlies and is secured to the frame members 137, the plate 138 being aligned with the plate 131. A pair of transversely spaced hydraulic cyinders 140 depend from the underside of the plate 138, generally in alignment with the hydraulic cylinder 132. The hydraulic cylinders 140 are of the single acting type and have piston rods 141 which extend upwardly through the plate 138, the upper ends of the piston rods 141 being secured to a bead aligner 142 which is identical with the bead aligner 134.

The hydraulic cylinders 132 and 140 being of the single acting type, it is necessary that some means be provided for returning the bead aligners 134 and 142 to their retracted positions. Accordingly, suitable return springs 143 are provided.

At this time, it is pointed out that although the cylinders 116 and 130 have been described as being hydraulic cylinders, they may be air cylinders, if desired. In the control system for the cylinders 116 and 130, a main supply line 144 is provided. A four-way valve 145 for controlling the operation of the cylinder 116 is provided. The four-way valve 145 has a line 146 connected to the line 144. Two lines 147 and 148 are connected to opposite ends of the cylinder 116 and to the four-way valve 145. The four-way valve 145 also includes an exhaust 149. Of course, if the cylinder 116 is a hydraulic cylinder, the exhaust 149 will be coupled to a return line (not shown).

A four-way valve 150 is also provided for controlling the operation of the cylinder 130. The four-way valve 150 is connected to the supply line 144 by a line 151. Lines 152 and 153 connect opposite ends of the cylinder 130 to the four-way valve 150. The four-way valve 150 also includes an exhaust 154 which, like the exhaust 149, will be connected to a return line in event the cylinder 130 is hydraulically operated.

In order that the bead aligners 134 and 142 may properly center a tire within the matrix 22, it is necessary that the bead aligners 134 and 142 be spaced equally distant with respect to a median plane passing through the center of the tread of the tire. Heretofore, this has presented a problem, since the weight of the upper bead aligner tends to increase the pressure applied on the upper bead, whereas the weight of the lower bead aligner detracts from the pressure applied to the lower bead. Furthermore, variations in thickness of beads in a single tire are to be found and affect the proper centering of the beads. A control system for operating the cylinders 132 and 140 in unison so that the bead aligners 134 and 142 move the same distances notwithstanding variations in loads thereon, has been provided. This system includes two pumps, generally referred to by the numeral 155, connected to the cylinders 132, and two pumps, generally referred to by the numeral 156, connected to the cylinders 140.

Each of the pumps 155 includes a cylinder 157 which has a piston 158 which, in its retracted position, is disposed in the left end thereof. Piston rods 160 are connected to the pistons 158 and extend from the left ends of the cylinders 157. The piston rods 160 are connected to a common force applying plate 161. Hydraulic lines 162 extend from the right ends of the cylinders 157 and are connected to their respective hydraulic cylinders 132.

An oil reservoir 163 is mounted in an elevated position with respect to the cylinders 157. The oil reservoir 163 has a main feeder line 164 which is, in turn, connected to auxiliary feeder lines 165 which open into the cylinders 157 intermediate their ends and to the right of the retracted position of each piston 158. In this manner, any leakage which may exist in the system is automatically replaced each time the pistons 158 are retracted.

The pumps 156 are identical to the pumps 155 and have cylinders 166. A piston 167 is disposed in each of the cylinders 166 and has at-rest position at the left end of the cylinder 166. A piston rod 168 extends through the left end of the cylinder 166 and is connected to a respective one of the pistons 167. The piston rods 168 are connected to the common force applying plate 161. Feed lines 169 extend from the main feed line 164 of the oil reservoir 163 and open into the cylinders 166 to the right of the at-rest positions of the pistons 167. Fluid lines 170 extend between the right ends of the cylinders 166 and respective ones of the hydraulic cylinders 140.

The piston rods 160 and 168 being connected to a common force applying plate 161, and the pumps 155 and 156 being of equivalent cayacity, it will be seen that the bead aligners 134 and 142 must move at the same rate and remain equi-distant with respect to a median line.

A double acting fluid motor 171 has a piston rod 172 connected to the force applying plate 161. The operation of the fluid motor 171 is controlled by a four-way valve 173 which is connected to the pressure line 144 by a fluid line 174. Fluid lines 175 and 176 extends between the four-way valve 173 and the fluid cylinder 171. The four-way valve 173 also has an exhaust 177, which, in the event the actuating fluid is a hydraulic fluid, will be connected to a return line.

Referring now to FIGURE 3 in particular, it will be seen that a plate 178 overlies the upper part of the frame 85 of the matrix loader 23. The cylinder 171, the pumps 155 and 156 and the oil reservoir 163 are suitably mounted on this plate 178. A control box 180 is positioned on the forward right corner of the frame 85 and is provided with suitable handles 181 for controlling the positions of the valves 145, 150 and 173.

Operation

When it is desired to open a matrix 22 for the removal of a treaded tire therefrom and the positioning of a tire to be treated therein, the matrix loader 23 is aligned with the intended matrix and suitably locked in place. Then by operating the valve 145, the cylinder 116 is actuated to lower the X-frame 118 down onto the top of the matrix 22. The cylinder 130 is then actuated by controlling the position of the valve 150 to move the supports 125 into engagement with the top matrix half 46. The supports 125, which function as clamps, clamp the upper matrix half 46. At the same time, the upper matrix half 46 is forcibly urged downwardly with respect to the lower matrix half 45 so that the locking band 52 may be released. The top matrix half 46 is now free to move upwardly with the X-frame 118. The valve 145 is now controlled to move the X-frame upwardly, carrying the matrix half 46 upwardly while the lower matrix half 45 remains stationary on its associated matrix support 21. The tire which has just been treaded is now free to be removed from the matrix. The bead aligners 134 and 142 may be used to unseat the treaded tire from the matrix half in which is sticks when the matrix is opened; should this be necessary.

When reloading the matrix 22, the bead aligners 134 and 142 are projected towards each other so that the bottom bead aligner is raised sufficiently to receive the uncured tire bead thereon to center the tire in the matrix. The bead aligners are then retracted with the uncured tire settling within the bottom matrix half. The valve 145 is then actuated to lower the top matrix half 46 to its cooperating position with respect to the bottom matrix half 45. While the matrix halves are being held in this position, the locking band 52 is replaced.

After the matrix has been locked up, the bead aligners 134 and 142 are centered to center the beads of the tire equi-distant between the matrix flanges, thereby centering the tire in the matrix and causing the tread of the tire to be centered on the tire. While holding the beads of the tire in this centered position, the curing tube positioned within the tire is inflated.

It will be readily apparent that since the two bead aligners 134 and 142 are moved equi-distant and always remain centered with respect to the center of the matrix 22, the beads of an associated tire are always properly aligned.

Although only a preferred embodiment of the bead aligner structure which is the subject of this invention has been specifically illustrated and described herein, it is to be understood that minor variations may be made therein within the spirit and scope of the invention, as defined by the appended claims.

I claim:

1. A bead aligning apparatus for engaging the beads of a tire to center a tire within a matrix, said bead aligning apparatus comprising a pair of opposed bead aligners for engaging tire beads of different diameters, and means for projecting and retracting said bead aligners at the same rate irrespective of variations between the resistances to the projecting and retracting.

2. A bead aligning apparatus for engaging the beads of a tire to center a tire within a matrix, said bead aligning apparatus comprising a pair of opposed bead aligners for engaging tire beads of different diameters, and means for projecting and retracting said bead aligners in unison and at the same rate irrespective of variations between resistances to the projecting and retracting.

3. A bead aligning apparatus for engaging the beads of a tire to center a tire within a matrix, said bead aligning apparatus comprising a pair of opposed bead aligners for engaging tire beads of different diameters, hydraulic cylinders connected to said bead aligners for projecting and retracting said bead aligners, a hydraulic pump directly connected to each of said hydraulic cylinders, and common actuating means for actuating said pumps to move said bead aligners in unison and at the same rate irrespective of variations between the resistances to the projecting and retracting.

4. The apparatus of claim 3 wherein said pumps have a constant supply of hydraulic fluid to compensate for any loss of hydraulic fluid.

5. The apparatus of claim 3 wherein each of said bead aligners is supported by a pair of said hydraulic cylinders arranged in diametrically opposite relation.

References Cited by the Examiner

UNITED STATES PATENTS

| | | | |
|---|---|---|---|
| 2,499,563 | 3/1950 | Bill. | |
| 2,734,225 | 2/1956 | Glynn | 18—18 |
| 2,835,921 | 5/1958 | White | 18—18 |
| 2,902,717 | 9/1959 | Duerksen | 18—18 |
| 2,942,295 | 6/1960 | Duerksen | 18—18 |
| 3,008,180 | 11/1961 | Woodhall | 18—2 |
| 3,074,109 | 1/1963 | Duerksen | 18—18 |

J. SPENCER OVERHOLSER, *Primary Examiner.*

MICHAEL V. BRINDISI, WILLIAM J. STEPHENSON,
*Examiners.*

J. H. FLINT, *Assistant Examiner.*